J. Stephens,
Plow.

No. 94663. Patented Sep. 7. 1869.

Witnesses:
W. D. Overell
G. E. Cotton

Inventor:
Jas. Stephens
per Munn &
Attorneys

UNITED STATES PATENT OFFICE.

JAMES STEPHENS, OF AGENCY CITY, IOWA.

IMPROVEMENT IN PLOWS.

Specification forming part of Letters Patent No. 94,663, dated September 7, 1869.

*To all whom it may concern:*

Be it known that I, JAMES STEPHENS, of Agency City, in the county of Wapello and State of Iowa, have invented a new and Improved Plow; and I do hereby declare that the following is a full, clear, and exact description thereof, which will enable those skilled in the art to make and use the same, reference being had to the accompanying drawings, forming part of this specification.

This invention relates to a new and improved plow, designed more especially to be used for cultivating corn and other crops which are grown in hills or drills.

The object of the invention is to obtain a plow of the class specified, which will be simple in construction and admit of different shovels or shares being readily applied, as the nature of the work may require.

Figure 1:
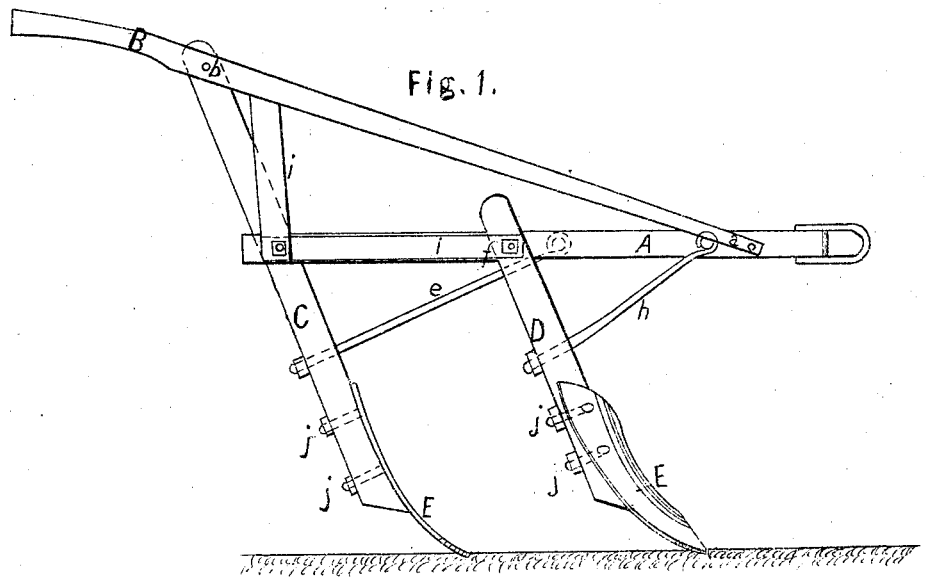
Figure 2:
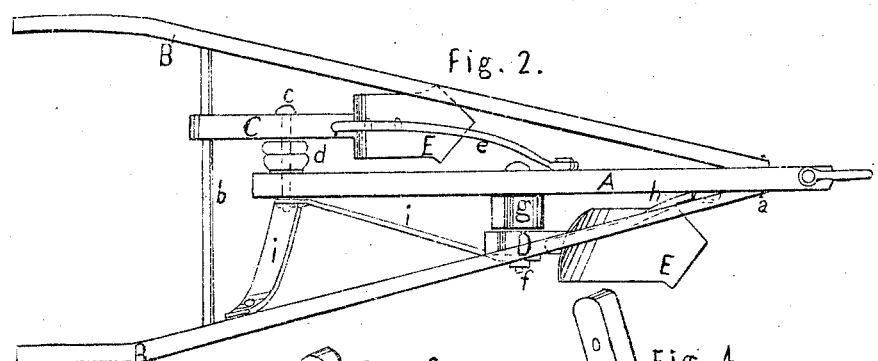
Figure 3:
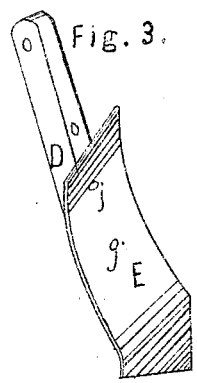
Figure 4:
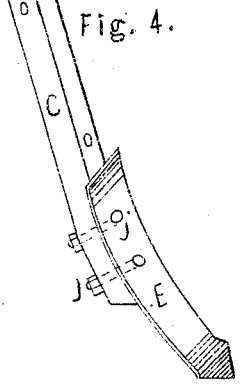

In the accompanying sheet of drawings, Figure 1 is a side view of my invention; Fig. 2, a plan or top view of the same; Figs. 3 and 4, detached views of shovels or shares pertaining to the same.

Similar letters of reference indicate corresponding parts.

A represents the beam of the plow; B B, the handles, the lower ends of which are attached to the beam, as shown at $a$, and the rear ends secured in position by a bar, $b$, which passes transversely through the upper end of a standard, C, the latter being attached to the rear end of the plow-beam by means of a bolt, $c$, which passes through the standard, a block, $d$, and the beam, as shown in Fig. 2, the standard being at the left-hand side of the beam. This standard is braced from the beam by a rod, $e$.

D is a short standard, which is attached to the right-hand side of the beam A, in advance of the standard C, by a bolt, $f$, the latter passing through the standard, a block, $g$, and the beam. This standard is braced from the beam A by a rod, $h$, and the handles and beam are braced and stiffened by flat bars $i\,i$, applied as shown in Figs. 1 and 2.

E represents the shovels or shares, which may be constructed in any of the known forms. These shovels or shares are connected to their standards by bolts $j$, and admit of being readily detached, so that others may be applied, different ones being used to suit the nature of the work to be performed, the earth sometimes being required to be thrown from the plants and at other times thrown toward them.

The implement is well braced throughout, so that none of the parts are liable to be injured by undue strain in any direction.

I claim as new and desire to secure by Letters Patent—

In combination with the frame, constructed as described, two shovels, arranged as specified, the right-hand one being removable, and so twisted as to throw all the dirt to the right or left, as may be desired.

JAMES STEPHENS.

Witnesses:
W. A. BURTON,
W. C. REYNOLDS.